United States Patent
Noor et al.

(10) Patent No.: US 10,891,110 B2
(45) Date of Patent: Jan. 12, 2021

(54) AES/CRC ENGINE BASED ON RESOURCE SHARED GALOIS FIELD COMPUTATION

(71) Applicant: The Board of Regents of The University of Texas System, Austin, TX (US)

(72) Inventors: Safwat Mostafa Noor, Bee Cave, TX (US); Eugene Britto John, San Antonio, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 13 days.

(21) Appl. No.: 16/215,587

(22) Filed: Dec. 10, 2018

(65) Prior Publication Data
US 2019/0179618 A1  Jun. 13, 2019

Related U.S. Application Data

(60) Provisional application No. 62/597,108, filed on Dec. 11, 2017.

(51) Int. Cl.
| | | |
|---|---|---|
| *G06F 7/72* | (2006.01) | |
| *H03M 13/09* | (2006.01) | |
| *H04L 9/06* | (2006.01) | |
| *H03M 13/15* | (2006.01) | |
| *G06F 17/16* | (2006.01) | |

(52) U.S. Cl.
CPC ............ *G06F 7/724* (2013.01); *H03M 13/09* (2013.01); *H03M 13/091* (2013.01); *H03M 13/158* (2013.01); *H04L 9/0631* (2013.01); *H04L 9/0637* (2013.01); *G06F 17/16* (2013.01); *H04L 2209/122* (2013.01); *H04L 2209/34* (2013.01)

(58) Field of Classification Search
CPC ...... G06F 7/724; G06F 17/16; H03M 13/158; H03M 13/091; H03M 13/09; H04L 9/0637; H04L 9/0631; H04L 2209/34; H04L 2209/122
USPC .......................................................... 708/492
See application file for complete search history.

(56) References Cited

U.S. PATENT DOCUMENTS

| | | | |
|---|---|---|---|
| 4,587,627 A | 5/1986 | Omura et al. | |
| 8,903,882 B2 * | 12/2014 | Boersma .................... | G06F 7/53 708/230 |
| 2008/0162806 A1 * | 7/2008 | Gopal ................. | G06F 11/1076 711/114 |

(Continued)

OTHER PUBLICATIONS

M. Andersen, "Trends in Internet of Things Platforms," XRDS, vol. 22, No. 2, pp. 40-43, Dec. 2015.

(Continued)

*Primary Examiner* — Tan V Mai
(74) *Attorney, Agent, or Firm* — Smith, Gambrell & Russell, LLP

(57) ABSTRACT

For example, the present techniques may provide an energy-efficient multipurpose encryption engine capable of processing both AES and CRC algorithms using a shared Galois Field Computation Unit (GFCU). In an embodiment, an apparatus may comprise computation circuitry adapted to perform Galois Field computations and control circuitry adapted to control the computation circuitry so as to selectively compute either an Advanced Encryption Standard cipher or a Cyclic Redundancy Check.

16 Claims, 13 Drawing Sheets

(56) References Cited

U.S. PATENT DOCUMENTS

| | | | |
|---|---|---|---|
| 2010/0119057 A1* | 5/2010 | Laurent | G06F 7/727 380/28 |
| 2010/0269008 A1* | 10/2010 | Leggette | G06F 21/78 714/752 |
| 2011/0231636 A1* | 9/2011 | Olson | H03M 13/09 712/222 |

OTHER PUBLICATIONS

D. E. Standard, "FIPS PUB 46-3," Append. Fed. Inf. Process. Stand. Publ., vol. 2, 1977.

J. Daemen and V. Rijmen, "Advanced encryption standard (AES)(FIPS 197)," Kathol. Univ. LeuvenESAT Tech Rep, 2001.

B. Schneier, "The Blowfish encryption algorithm," Dr Dobbs J.—Softw. Tools Prof. Program., vol. 19, No. 4, pp. 38-43, 1994.

D. S. A. Elminaam, H. M. A. Kader, and M. M. Hadhoud, "Performance Evaluation of Symmetric Encryption Algorithms on Power Consumption for Wireless Devices," Int. J. Comput. Theory Eng., vol. 1, No. 4, p. 343, Oct. 2009.

M. Agrawal and P. Mishra, "A comparative survey on symmetric key encryption techniques," Int. J. Comput. Sci. Eng., vol. 4, No. 5, p. 877, 2012.

J. S. Sobolewski, "Cyclic Redundancy Check," Encyclopedia of Computer Science. John Wiley and Sons Ltd., Chichester, UK, pp. 476-479.

J. Bryson and P. Gallagher, "Secure hash standard (SHS)," Fed. Inf. Process. Stand. FIPS PUB 180-4, 2012.

IEEE Standard for Telecommunications and Information Exchange Between Systems—LAN/MAN—Specific Requirements—Part 15: Wireless Medium Access Control (MAC) and Physical Layer (PHY) Specifications for Wireless Personal Area Networks (WPANs), IEEE Std 802.15.Jan. 2002, pp. 1-473, Jun. 2002.

IEEE Standard for Information Technology—Telecommunications and Information Exchange Between Systems—Local and Metropolitan Area Networks-Specific Requirements—Part 11: Wireless LAN Medium Access Control (MAC) and Physical Layer (PHY) Specifications, IEEE Std 802.Nov. 1997, p. i-445, 1997.

IEEE Standard for Local and metropolitan area networks—Part 15.4: Low-Rate Wireless Personal Area Networks (LR-WPANs), IEEE Std 802.15A-2011 Revis. IEEE Std 802.15.4-2006, pp. 1-314, Sep. 2011.

D. Panescu, "Emerging Technologies [wireless communication systems for implantable medical devices]," IEEE Eng. Med. Biol. Mag., vol. 27, No. 2, pp. 96-101, Mar. 2008.

N. Pramstaller, S. Mangard, S. Dominikus, and J. Wolkerstorfer, "Efficient AES Implementations on ASICs and 7PGAs," in Advanced Encryption Standard—AES, H. Dobbertin, V. Rijmen, and A. Sowa, Eds. Springer Berlin Heidelberg, 2004, pp. 98-112.

J. Daemen and V. Rijmen, AES Proposal: Rijndael. 1999.

J. Daemen and V. Rijmen, The design of Rijndael: AES—the advanced encryption standard. Springer Science & Business Media, 2013.

H. Dobbertin, L. Knudsen, and M. Robshaw, "The Cryptanalysis of the AES—A Brief Survey," in Advanced Encryption Standard—AES, H. Dobbertin, V. Rijmen, and A. Sowa, Eds. Springer Berlin Heidelberg, 2004, pp. 1-10.

L. Thulasimani and M. Madheswaran, "A single chip design and implementation of aes-128/192/256 encryption algorithms," Int. J. Eng. Sci. Technol., vol. 2, No. 5, pp. 1052-1059, 2010.

N. Ahmad, R. Hasan, and W. M. Jubadi, "Design of AES S-box using combinational logic optimization," in 2010 IEEE Symposium on Industrial Electronics Applications (ISIEA), 2010, pp. 696-699.

Datasheet of ARM-based 32-bit MCU, STM32F2 from STMicroelectronics. [Online]. Available: http://www.st.com/content/ccc/resource/technical/document/datasheet/bc/21/42/43/b0/f3/4d/d3/CD00237391.pdf/files/CD00237391.pdf/jcr:content/translations/en.CD00237391.pdf.

S. Didla, A. Ault, and S. Bagchi, "Optimizing AES for Embedded Devices and Wireless Sensor Networks," in Proceedings of the 4th International Conference on Testbeds and Research Infrastructures for the Development of Networks & Communities, ICST, Brussels, Belgium, Belgium, 2008, p. 4:1-4:10.

M. Damall and D. Kuhlman, "AES Software Implementations on ARM7TDMI," in Progress in Cryptology—INDOCRYPT 2006, R. Barua and T. Lange, Eds. Springer Berlin Heidelberg, 2006, pp. 424-435.

G. Bertoni, L Breveglieri, P. Fragneto, M. Macchetti, and S. Marchesin, "Efficient Software Implementation of AES on 32-Bit Platforms," in Cryptographic Hardware and Embedded Systems—CHES 2002, B. S. Kaliski, çetin K. Koç, and C. Paar, Eds. Springer Berlin Heidelberg, 2002, pp. 159-171.

N. W. Group and others, "RFC 1950," ZLIB Compress. Data Format Specif. Version, vol. 3, 1996.

R. Goldman et al., "Synopsys' open educational design kit: capabilities, deployment and future," in Microelectronic Systems Education, 2009. MSE'09. IEEE International Conference on, 2009, pp. 20-24.

C. Gomez, J. Oller, and J. Paradells, "Overview and evaluation of bluetooth low energy: An emerging low-power wireless technology," Sensors, vol. 12, No. 9, pp. 11734-11753, 2012.

T. Good and M. Benaissa, "692-nW Advanced Encryption Standard (AES) on a 0.13-m CMOS," IEEE Trans. Very Large Scale Integr. VLSI Syst., vol. 18, No. 12, pp. 1753-1757, Dec. 2010.

T. M. Sharma and R. Thilagavathy, "Performance analysis of advanced encryption standard for low power and area applications," in 2013 IEEE Conference on Information Communication Technologies (ICT), 2013, pp. 967-972.

P. Hamalainen, T. Alho, M. Hannikainen, and T. D. Hamalainen, "Design and Implementation of Low-Area and Low-Power AES Encryption Hardware Core," in 9th EUROMICRO Conference on Digital System Design: Architectures, Methods and Tools, 2006. DSD 2006, 2006, pp. 577-583.

\* cited by examiner

Fig. 1

| 0 | 1 | 0 | 1 | 0 | 0 | 1 | 1 |
|---|---|---|---|---|---|---|---|

Byte =

Coefficient = $a_7$ $a_6$ $a_5$ $a_4$ $a_3$ $a_2$ $a_1$ $a_0$

Polynomial = $a_7 x^7 + a_6 x^6 + a_5 x^5 + a_4 x^4 + a_3 x^3 + a_2 x^2 + a_1 x^1 + a_0 x^0$ $A(x) = x^6 + x^4 + x + 1$

Fig. 6

| Mode | Function | Shift (L/R) | Used Values | Output | Storage | Remarks |
|---|---|---|---|---|---|---|
| I | XOR | 0 | in1, in2 | in1 ⊕ in2 | none | Used for *AddRoundKey* |
| II | T1_XOR | 0 | in1, temp1 | in1 ⊕ temp1 | temp1 | Used for *MixColumns* |
| III | T12_XOR | 0 | temp1, temp2 | temp1 ⊕ temp2 | temp1 | Used for *MixColumns, CRCInit* |
| IV | ROTATE_8 | 8 (L) | in1, msb_out | in1 ⊕ msb_out | none | Used for *ShiftRows, InvShiftRows* and *CRCInit* |
| V | ROTATE_16 | 16 (L) | in1, msb_out | in1 ⊕ msb_out | none | Used for *ShiftRows, InvShiftRows* |
| VI | ROTATE_24 | 24 (L) | in1, msb_out | in1 ⊕ msb_out | none | Used for *ShiftRows, InvShiftRows* |
| VII | MULT_T1 | 1 (L) | in1, in2 | in1 ⊕ in2 | temp1 | Used for *MixColumns, InvMixColumns* |
| VIII | MULT_T2 | 1 (L) | in1, in2 | in1 ⊕ in2 | temp2 | Used for *MixColumns, InvMixColumns* |
| IX | PASS1 | 0 | in1 | in1 | temp1 | Used for *ShiftRows* |
| X | PASS2 | 0 | in2 | in2 | temp2 | Used for *CRCInit* |
| XI | BYTE_LOAD | 8 (L) | msb_out, temp2 | msb_out ⊕ temp2 | temp1, temp2 | Used for *CRCByteLoad* |
| XII | CRC_XOR | 1 (R) | temp1, in2 | temp1 ⊕ in2, temp1 | temp1, temp2 | Used for *CRCComp* |

Fig 8

$$\begin{bmatrix} 2 & 3 & 1 & 1 \\ 1 & 2 & 3 & 1 \\ 1 & 1 & 2 & 3 \\ 3 & 1 & 1 & 2 \end{bmatrix} \otimes \begin{matrix} \text{Row 1} \\ \text{Row 2} \\ \text{Row 3} \\ \text{Row 4} \end{matrix} \begin{bmatrix} B_0 & B_1 & B_2 & B_3 \\ B_4 & B_5 & B_6 & B_7 \\ B_8 & B_9 & B_{10} & B_{11} \\ B_{12} & B_{13} & B_{14} & B_{15} \end{bmatrix} = \begin{bmatrix} B'_0 & B'_1 & B'_2 & B'_3 \\ B'_4 & B'_5 & B'_6 & B'_7 \\ B'_8 & B'_9 & B'_{10} & B'_{11} \\ B'_{12} & B'_{13} & B'_{14} & B'_{15} \end{bmatrix} \begin{matrix} \leftarrow 802 \\ \leftarrow 804 \\ \leftarrow 806 \\ \leftarrow 808 \end{matrix}$$

$$\begin{aligned} B'_0 &= 2B_0 + 3B_1 + B_2 + B_3 \\ B'_4 &= 2B_4 + 3B_5 + B_6 + B_7 \\ B'_8 &= 2B_8 + 3B_9 + B_{10} + B_{11} \\ B'_{12} &= 2B_{12} + 3B_{13} + B_{14} + B_{15} \end{aligned}$$

Row 1   Row 2   Row 3   Row 4

Row Calculation Steps

1. Partial result 1 = Multiply input row 1 by 2
2. Partial result 2 = Multiply input row 2 by 3
3. Partial result 3 = Multiply input row 3 by 1
4. Partial result 4 = Multiply input row 4 by 1
5. Add (XOR) and accumulate results to output row ← 810
6. Adjust and repeat for all output rows ← 812

800

1200

1300

AES/CRC ENGINE BASED ON RESOURCE SHARED GALOIS FIELD COMPUTATION

CROSS-REFERENCE TO RELATED APPLICATIONS

This application claims the benefit of U.S. Provisional Application No. 62/597,108, filed Dec. 11, 2017, the contents of which are incorporated herein in their entirety.

STATEMENT REGARDING FEDERALLY SPONSORED RESEARCH

This invention was made with government support under Grant Number 1SC3GM096937-01A1, awarded by the National Institutes of Health. The government has certain rights in the invention.

BACKGROUND OF THE INVENTION

The present invention relates to the technical field of a hardware device for computation of encryption algorithms.

Trends in present and upcoming technology exhibit a steady evolution towards data-centric connected devices. This trend promises a future where smart features and connectivity will be omnipresent in electronic products. Even at present, wired or wireless connectivity are emerging in a large variety of new applications, ranging from consumer electronics to critical biomedical devices. This increase in data traffic creates new concerns about the security and the reliability of the information being transmitted. Privacy of information is of major importance in modern communication and various encryption standards have been developed over the years to address this need. Data Encryption Standard (DES), Advanced Encryption Standard (AES), and Blowfish are examples of some of the encryption algorithms that are currently in practice.

In addition to security, the need for reliable data transmission has long been a requirement that has been addressed by various error checking methods, such as Cyclic Redundancy Check (CRC), Secured Hashing Algorithm (SHA), etc. CRC has multiple variants and is typically employed in a hardware layer of the communication protocol whereas variants of SHA are used at higher abstraction levels. The IEEE 802.15.1 wireless protocol, also known as Bluetooth, is an example of a protocol in which both AES and CRC are utilized to achieve secure and robust connectivity. Other popular examples of AES and CRC usage may include IEEE 802.11 (Wireless LAN) and IEEE 802.15.4 (ZigBee).

Designing a product with a secure and reliable communication interface requires additional computational resources to processes AES, CRC or similar algorithms. These computational elements can be developed as a separate integrated circuit (IC) or can be integrated as a part of the main system on chip (SoC). This can become challenging in ultra-low-power embedded systems where power and area are at a premium. In many cases, minimizing the power and area requirement of these components may take precedence over maximum throughput.

For example, in implantable biomedical devices, such as connected smart cardiac pacemakers, the data transmission rate may typically be considered as a secondary and intermittent task. The primary need for strong encryption in state-of-the art connected cardiac pacemakers is to prevent malicious device re-configuration and to ensure the privacy of transmitted personal medical data. A pacemaker also needs to ensure absolutely error free communication as data corruption can result in life threatening consequences. The data transfer rate of these devices does not enforce a strong requirement for speed. With the extra headroom in timing requirements, the design of encryption and reliability circuitry can be optimized for low throughput in mind. Such implementations of AES or CRC can also be found in smartcards, where low power operation holds higher priority than data rate. While software implementation of AES (Stack Controller) is possible, it is most often implemented in hardware, as a part of the controller core.

Accordingly, a need arises for computation techniques that provide a reduction in power consumption and integrated circuit layout area.

SUMMARY OF THE INVENTION

The techniques described herein may provide computation methods that provide a reduction in power consumption and integrated circuit layout area. For example, a low-power and area efficient hardware engine for computing both AES and CRC algorithms may be realized. By identifying the arithmetic similarity of these two algorithms, a novel design that shares hardware resources was developed. This approach facilitates the implementation of an area efficient solution, all the while reducing the number of gates that is needed to be active any given moment. The present techniques may deliver a significant reduction in power and area. For example, the present techniques may provide an energy-efficient multipurpose encryption engine capable of processing both AES and CRC algorithms using a shared Galois Field Computation Unit (GFCU). By decomposing the Galois Field operations of AES and CRC to their fundamental binary steps, the similarity of these two algorithms in terms of their gate level activity may be identified. This approach provided a resource shared system architecture capable of computing AES-128 and CRC-32 using a single computation unit.

For example, in an embodiment, an apparatus may comprise computation circuitry adapted to perform Galois Field computations and control circuitry adapted to control the computation circuitry so as to selectively compute either an Advanced Encryption Standard cipher or a Cyclic Redundancy Check.

In embodiments, the control circuitry may comprise memory interface circuitry adapted to request a plurality of externally stored predetermined constant values, selection circuitry adapted to select a predetermined constant value for input to the computation circuitry, memory circuitry adapted to store a plurality of input and output data, and control circuitry sequencing circuitry adapted to output control signals to the selection circuitry, the memory circuitry, and the computation circuitry in a plurality of sequences, each sequence adapted to perform a computation. The computation circuitry may comprise exclusive-OR circuitry adapted to perform a bitwise exclusive-OR on selected data, shifter circuitry adapted to perform a circular left shift on selected data, memory circuitry adapted to store a plurality of data, selection circuitry adapted to select data input to or output from the exclusive-OR circuitry, the shifter circuitry, and the memory circuitry, and computation circuitry sequencing circuitry adapted to receive the control signals from the control the control circuitry selection circuitry to control the selection circuitry, the memory circuitry, the exclusive-OR circuitry, and the shifter circuitry to perform computational steps in the plurality of sequences adapted to perform computations.

In embodiments, the computational steps may comprise at least one step of an AES AddRoundKey operation, an AES MixColumns operation, an AES ShiftRows operation, an AES InvShiftRows operation, an AES InvMixColumns operation, a CRC CRCInit operation, a CRC CRCByteLoad operation, and a CRC CRCComp operation. For example, the AES ShiftRows operation may comprise the shifter circuitry shifting an input state to form a most significant intermediate value and a least significant intermediate value and the exclusive-OR circuitry performing a bitwise exclusive-OR on the most significant intermediate value and a least significant intermediate value to form an output value representing an output of the AES ShiftRows operation. The AES MixColumns operation may comprise a matrix multiplication operation comprising a Galois Field multiply-by-2 operation comprising the shifter circuitry shifting an input state to form an intermediate value, memory interface circuitry adapted to request a plurality of externally stored predetermined constant values providing a selected predetermined constant value and the exclusive-OR circuitry performing a bitwise exclusive-OR on the intermediate value and the selected predetermined constant value to form an output value representing an output of the Galois Field multiply-by-2 operation. The AES MixColumns operation may further comprise a matrix multiplication operation comprising a Galois Field multiply-by-3 operation comprising the exclusive-OR circuitry performing a bitwise exclusive-OR on the input state and the output of the Galois Field multiply-by-2 operation to form an output of the Galois Field multiply-by-3 operation.

In embodiments, the CRC CRCByteLoad operation may comprise the shifter circuitry shifting an input state to form an intermediate value, memory interface circuitry adapted to request a plurality of externally stored predetermined constant values providing a selected predetermined constant value representing a CRC initial value, and the exclusive-OR circuitry performing a bitwise exclusive-OR on the intermediate value and the selected predetermined constant value to form an output value representing an output of the CRC CRCByteLoad operation.

In embodiments, the apparatus may be implemented in at least one of a consumer electronic device and a biomedical device.

In an embodiment, a method may comprise performing Galois Field computations using computation circuitry, and controlling the computation circuitry so as to selectively compute either an Advanced Encryption Standard cipher or a Cyclic Redundancy Check.

In embodiments, the controlling may comprise requesting a plurality of externally stored predetermined constant values, selecting a predetermined constant value, storing a plurality of input and output data, and controlling selection and output of the predetermined constant values and of the input and output data to the computation circuitry in a plurality of sequences, each sequence adapted to perform a computation. The computation circuitry may comprise exclusive-OR circuitry adapted to perform a bitwise exclusive-OR on selected data, shifter circuitry adapted to perform a circular left shift on selected data, memory circuitry adapted to store a plurality of data, selection circuitry adapted to select data input to or output from the exclusive-OR circuitry, the shifter circuitry, and the memory circuitry, and computation circuitry sequencing circuitry; and the method may further comprise receiving the control signals to control the selection circuitry, the memory circuitry, the exclusive-OR circuitry, and the shifter circuitry to perform computational steps in the plurality of sequences adapted to perform computations.

In embodiments, the computational steps may comprise at least one step of an AES AddRoundKey operation, an AES MixColumns operation, an AES ShiftRows operation, an AES InvShiftRows operation, an AES InvMixColumns operation, a CRC CRCInit operation, a CRC CRCByteLoad operation, and a CRC CRCComp operation. The AES ShiftRows operation may comprise shifting an input state, by the shifter circuitry, to form a most significant intermediate value and a least significant intermediate value and performing a bitwise exclusive-OR, by the exclusive-OR circuitry, on the most significant intermediate value and a least significant intermediate value to form an output value representing an output of the AES ShiftRows operation. The AES MixColumns operation may comprise a matrix multiplication operation comprising a Galois Field multiply-by-2 operation comprising shifting an input state, by the shifter circuitry, to form an intermediate value, providing a selected predetermined constant value, and performing a bitwise exclusive-OR, by the exclusive-OR circuitry, on the intermediate value and the selected predetermined constant value to form an output value representing an output of the Galois Field multiply-by-2 operation. The AES MixColumns operation may further comprise a matrix multiplication operation comprising a Galois Field multiply-by-3 operation comprising performing a bitwise exclusive-OR, by the exclusive-OR circuitry, on the input state and the output of the Galois Field multiply-by-2 operation to form an output of the Galois Field multiply-by-3 operation.

In embodiments, the CRC CRCByteLoad operation may comprise shifting, by the shifter circuitry, an input state to form an intermediate value, providing a selected predetermined constant value representing a CRC initial value, and performing a bitwise exclusive-OR, by the exclusive-OR circuitry, on the intermediate value and the selected predetermined constant value to form an output value representing an output of the CRC CRCByteLoad operation.

In embodiments, the method may be performed in at least one of a consumer electronic device and a biomedical device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

FIG. 1 illustrates an example of a representation of a byte as coefficients of a polynomial in $GF(2^8)$.

FIG. 6 illustrates an example of selectable functions for the Galois Field Computation Unit shown in FIG. 5.

FIG. 8 illustrates an example of row-wise computation of the MixColumns step for a single row.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The techniques described herein may provide computation techniques that provide a reduction in power consumption and integrated circuit layout area. For example, the present techniques may provide an energy-efficient multi-purpose encryption engine capable of processing both AES and CRC algorithms using a shared Galois Field Computation Unit (GFCU). By decomposing the Galois Field operations of AES and CRC to their fundamental binary steps, the similarity of these two algorithms in terms of their gate level activity may be identified. This approach provided a resource shared system architecture capable of computing AES-128 and CRC-32 using a single computation unit.

Although AES and CRC are two different algorithms developed for different use cases, their underlying operations are computed using the same finite field arithmetic, also known as the Galois Field (GF). The Galois Field (GF) may refer to any number space in which a finite set of unique elements exists, in contrast to the real number space (R) consisting of infinite unique elements. AES and CRC are computed in GF(2) (read as Galois Field 2) which contains only two unique numbers, 0 and 1, similar to a bit in binary space. The mapping of a byte (8-bits) to GF(2) is called $GF(2^8)$ and is represented as a polynomial in the Galois Field. Each bit represents the value of a corresponding coefficient of the polynomial. For example, a byte with the value 01010011 is equivalent to the polynomial $x^6+x^4+x+1$ in $GF(2^8)$. This mapping is visualized in FIG. 1. All computation in the AES algorithm is performed on $8^{th}$ order polynomials in $GF(2^8)$ space.

Figure 2:
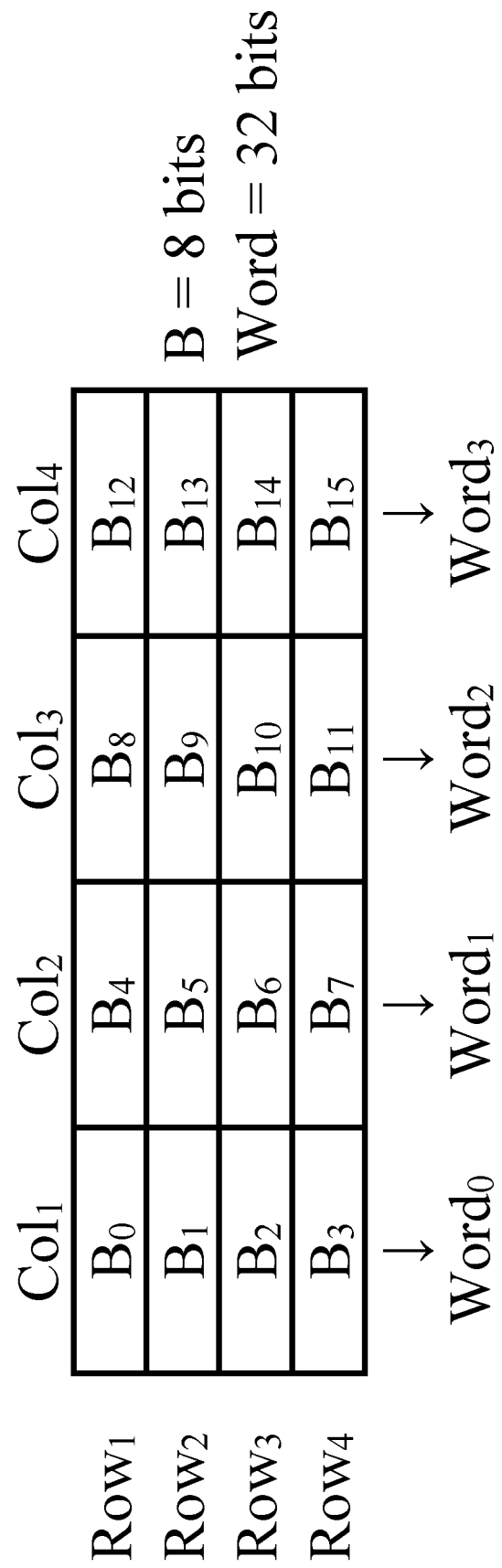
FIG. 2 illustrates an example of byte and word arrangement in an input array, also called a "state".

AES is a cipher in which the cipher key is limited to three specific sizes, either 128, 192 or 256 bits. A higher number of bits is considered to be stronger against intrusion attacks. Therefore, AES-256 is much more secure than AES-128 due to the computational complexity to perform a brute force/algorithmic attack to identify the cipher key used for encryption. In this invention, the design of an AES-128 is pursued due to its widespread application and popularity. A hardware developed for AES-128 can be easily scaled to larger key sizes if needed. The input and output to the AES-128 algorithm are always 128-bits or 16-bytes long. The algorithm outputs 16-bytes of encrypted data which eliminates any meaningful resemblance to the input. The 16-bytes may be represented as a two-dimensional array, referred to as the state. An example of a state is shown in FIG. 2. The state can also be thought of as a one-dimensional array with 4 words (32-bits).

The algorithm for a 128-bit AES Encryption consists of 10 rounds of processing. This increases to 12 rounds for a 192-bit key and 14 rounds for a 256-bit key. The number of steps in each round is identical, except for the last round. Each round of processing includes a single-byte based substitution step (SubBytes), a row-wise rotating shift step (ShiftRows), a column-wise mixing step (MixColumns), and the addition of the round key (AddRoundKey). The order in which these four steps are executed is different for encryption and decryption. The decryption procedure requires the inverse of SubBytes, ShiftRows and MixColumns steps, termed as InvSubBytes, InvShiftRows and InvMixcolumns. The AddRoundKey is similar in both forward and reverse cipher. In each round of AES, the key is expanded using a "Key Schedule" algorithm. The AES algorithm also involves lookup from pre-populated "SBOX" and "Reverse SBOX" tables in the SubBytes and the InvSubBytes step respectively.

Figure 3:
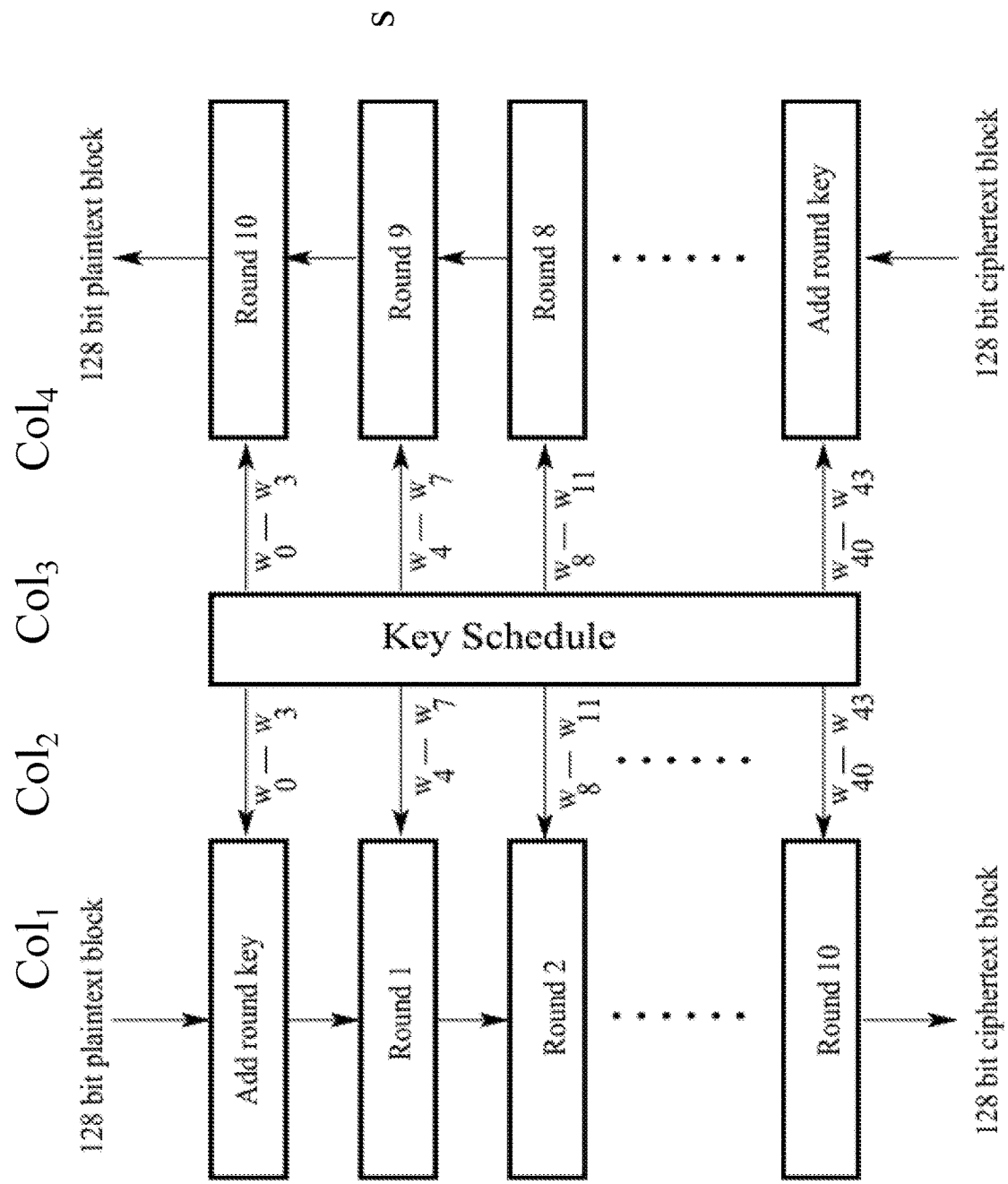
FIG. 3 illustrates an example of the overall flow of AES for the case of 128-bit encryption key.

An example of the overall flow of a 128-bit cipher and inverse cipher for AES is shown in FIG. 3. The present techniques may compute the 10 rounds of an AES-128. The SBOX may be pre-computed and the key may be scheduled once and used for multiple input states.

Each round of the AES algorithm computes the four steps in sequence. The AddRoundKey step performs an addition of each byte in the state with each byte in the key. Addition in $GF(2^8)$ is equivalent to a logical XOR between the bytes. The arithmetic rule for addition and subtraction of two 8-bit GF polynomials A(x) and B(x) is listed in Equation (1):

$$A(x) + B(x) = \sum_{i=0}^{7} c_i x_i, \text{ where } c_i \equiv (a_i \pm b_i) \bmod 2 \quad (1)$$

where $x_i$ is the i-th bit of the result, $c_i$ is the coefficient of $x_i$, $a_i$ is the i-th coefficient in A(x) and $b_i$ is the i-th coefficient in B(x). From Equation (1), it is seen that addition and subtraction in $GF(2^8)$ is a bitwise XOR operation between the coefficients of two polynomials or simply the bits of two bytes. The AddRoundKey step is also utilized in the inverse cipher of the AES decryption process. The SubBytes step performs a lookup in the SBOXtable using the bytes of the state as addresses. The looked-up values are then used to replace the original bytes. In the reverse cipher, a reversed SBOX is used to perform the lookup in the InvSubBytes step. The ShiftRows step performs a circular left shift of each row of the state. The amount of shift is (r−1) where r indicates the row number and ranges from 1 to 4. In contrast, the InvShiftRows step performs a circular right shift of each row with the same shift amount. The MixColumns step is the most complex step of the entire algorithm. In this step, a constant 4×4 matrix in GF($2^8$) denoted by C is multiplied with each column of the state. Since each column consists of four bytes, it can be considered as a 4×1 matrix. Therefore, the matrix multiplication of each column with C results in a new 4×1 matrix. This result is used to replace the original column in the state. The arithmetic representation of MixColumns step is given in Equation (2).

$$S_i' = C \otimes S_i \tag{2}$$

where, $S_i'$=column i of the output state, $S_i$=column i of the input state and $$C = \begin{bmatrix} 2 & 3 & 1 & 1 \\ 1 & 2 & 3 & 1 \\ 1 & 1 & 2 & 3 \\ 3 & 1 & 1 & 2 \end{bmatrix} \text{ for } 1 \le i \le 4$$

The constant matrix used in this step is defined in the AES specifications. Due to the limited variation in the C matrix, MixColumns only require doubling (multiply-by-2) and tripling operation (multiply-by-3) along with addition, all of which are performed on GF($2^8$) polynomials. Multiplication in GF($2^8$) is performed using different arithmetic rules and requires special hardware to implement. Rather than implementing an entire multiplier for GF($2^8$) polynomials, it is efficient to implement only doubling and tripling circuits due to simplification that can be achieved. The rule of multiplication in GF($2^8$) is given in Equation (3).

$$A(x) \times B(x) = [(a_7x^7 + a_6x^6 \ldots a_0x^0) \times (b_7x^7 + b_6x^6 b_0x^0)] \bmod P(x) \tag{3}$$

where, A(x) and B(x) denotes the two polynomial inputs and P(x) is an irreducible polynomial in GF($2^8$). P(x) can take on different values, but a fixed polynomial $x^8+x^4+x^3+x+1$ is defined by the specifications of AES. Based on Equation 3, a doubling operation can be simplified to a left shift and a conditional XOR operation with a constant value of 00011011. The step by step operation for doubling is given in Equations 4.a to 4.e:

$$A(x) \times 2 = [(a_7x^7 + a_6x^6 \ldots a_0x^0) \times 2] \bmod P(x) \tag{4.a}$$

$$A(x) \times 2 = [(a_7x^7 + a_6x^6 \ldots a_0x^0) \times x] \bmod (x^8 + x^4 + x^3 + x + 1) \tag{4.b}$$

$$A(x) \times 2 = (a_7x^8 + a_6x^7 \ldots a_0x^1) \bmod (x^8 + x^4 + x^3 + x + 1) \tag{4.c}$$

$$A(x) \times 2 = (a_6x^7 + a_5x^6 + a_4x^5 + (a_3 \oplus a_7)x^4 + (a_2 \oplus a_7)x^3 + a_1x^2 + (a_0 \oplus a_7)x + a_7) \tag{4.d}$$

$$A(x) \times 2 = \begin{cases} (A(x) \ll 1) \oplus 00011011_{Binary}, a_7 = 1 \\ (A(x) \ll 1), a_7 = 0 \end{cases} \tag{4.e}$$

Following the rule of multiplication, the tripling operation can be simplified to a doubling operation followed by an addition of the same polynomial. The addition in GF($2^8$) is nothing more than an unconditional XOR operation. The steps for the tripling operation are given in Equations 5.a and 5.e:

$$A(x) \times 3 = [(a_7x^7 + a_6x^6 \ldots a_0x^0)x^3] \bmod P(x) \tag{5.a}$$

$$A(x) \times 3 = [(a_7x^7 + a_6x^6 \ldots a_0x^0) \times (x+1)] \bmod (x^8+x^4+x^3+x+1) \tag{5.b}$$

$$A(x) \times 3 = [(a_7x^8 + a_6x^7 \ldots a_0x^1) + (a_7x^7 + a_6x^6 \ldots a_0x^0)] \bmod (x^8+x^4+x^3+x+1) \tag{5.c}$$

$$A(x) \times 3 = (a_7x^8 + a_6x^7 \ldots a_0x^1) \bmod (x^8+x^4+x^3+x+1) + (a_7x^7 + a_6x^6 \ldots a_0x^0) \tag{5.d}$$

$$A(x) \times 3 = [A(x) \times 2] \oplus A(x) \tag{5.e}$$

Based on the equations presented, the MixColumns step can be decomposed down to a conditional sequence of two simple logical operations: i) A logical left shift and ii) A logical XOR. The InvMixColumns step needed for the inverse cipher involves the same transformation given in Equation (2) using a different constant matrix defined in Equation (6). The computations involved to multiply the state polynomials by 0e, 0b, 0d and 09 can be broken down to a sequence of multiply-by-2 and multiply-by-3 operations.

$$C = \begin{bmatrix} 0e & 0b & 0d & 09 \\ 09 & 0e & 0b & 0d \\ 0d & 09 & 0e & 0b \\ 0b & 0d & 09 & 0e \end{bmatrix} \tag{6}$$

One of the most common computational operations that occur in many current day digital devices is CRC or Cyclic Redundancy Check. CRC is a technique of ensuring the reliability of data transmission or data storage where there is a possibility of data loss or corruption due to noise or other causes. It works by attaching a few bits of additional encoded information with the actual data before transmission or storage. These extra bits are computed using a hashing algorithm and can be used by the receiver/retriever to ensure that the data integrity is maintained, or in other words, to check if the data is same as when the CRC hash was calculated. The output of the CRC calculation can range from a single bit to multiple bytes. Depending on the length of the CRC result length; there exist multiple CRC standards. The flow of calculation involving these CRC standards are relatively the same, and most of the difference is just in the endian-ness of the data, the chosen polynomial and the choice of an inverted final result.

Figure 4:
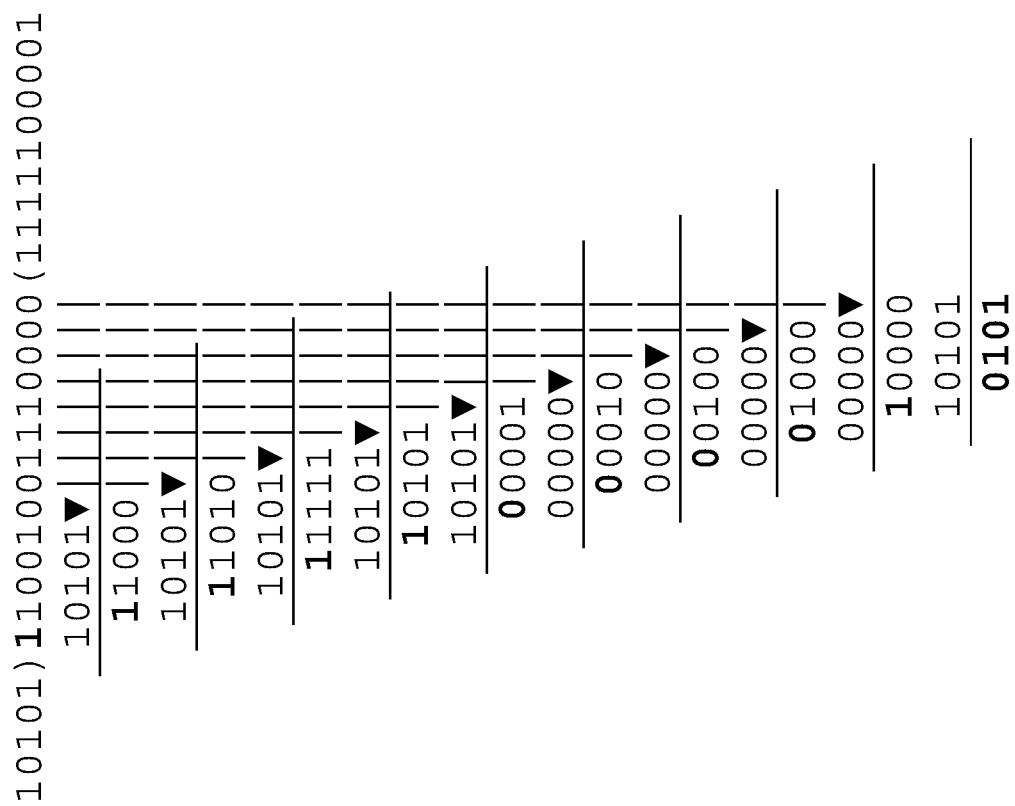
FIG. 4 illustrates an example of calculation of a 4-bit CRC using long division steps implemented as a left shift and a logical XOR operation.

The CRC hash is based on GF(2) polynomial arithmetic similar to AES. The data for which CRC has to be computed is considered to be a long binary number or a polynomial in GF(2). The hash algorithm divides this number with an irreducible polynomial and saves the remainder as the CRC output. Depending on the length of this polynomial, the CRC is called either CRC-8, CRC-16 or CRC-32. Division in GF(2) is visualized as a simple long division of polynomials and can be simplified to repeated shift and subtract operations. Referring back to Equation (1), a subtraction in GF(2) is same as an addition and can be performed via an XOR operation. An example of the shift and XOR method of calculation is shown in FIG. 4 for the random data 11001001110000 using a 4-bit polynomial 10101. Due to the underlying finite field arithmetic, the fundamental operations of CRC are similar to AddRoundKey and ShiftRows steps of AES, allowing for a shared design approach.

The CRC-32 is a variant of the CRC algorithm that enforces the use of an initial value, inversion of the result, and processing of the input bit stream in a reversed manner. The reverse processing requirement is usually achieved by processing the most significant byte first from a data stream. The overall implementation of CRC-32 can be broken down to three fundamental steps: CRCInit, CRCByteLoad and CRCComp. The CRCInit step loads the initial 32-bit CRC value of 0xFFFFFF to the system. The CRCByteLoad step extracts the most significant byte from the data stream and XOR's with the initial value. The result of CRCByteLoad is used in the CRCComp step to compute the CRC of each byte using the "Shift and XOR" method discussed earlier. To compute the CRC of a state, each byte of the state has to be processed sequentially using a combination of CRCByteLoad and CRCComp.

Given the similarity in computation that exists between AES and CRC, the present techniques may include a novel computation unit that can be configured as needed to process either AES or CRC. To reduce the complexity of the design, some modifications to the AES may be introduced. These modifications may enforce a row-wise access to the state, eliminating the need for byte level operations in the ShiftRows and MixColumns steps. The computation unit assumes a row of the input state is provided at the input. The computation methods are designed to generate a row of the output state. This row-wise 32-bit access method is different than the column-wise algorithm described in the original specification document for AES. From an arithmetic perspective, this circuit may be termed as a Galois Field Computation Unit (GFCU) with selectable output modes.

Figure 5:
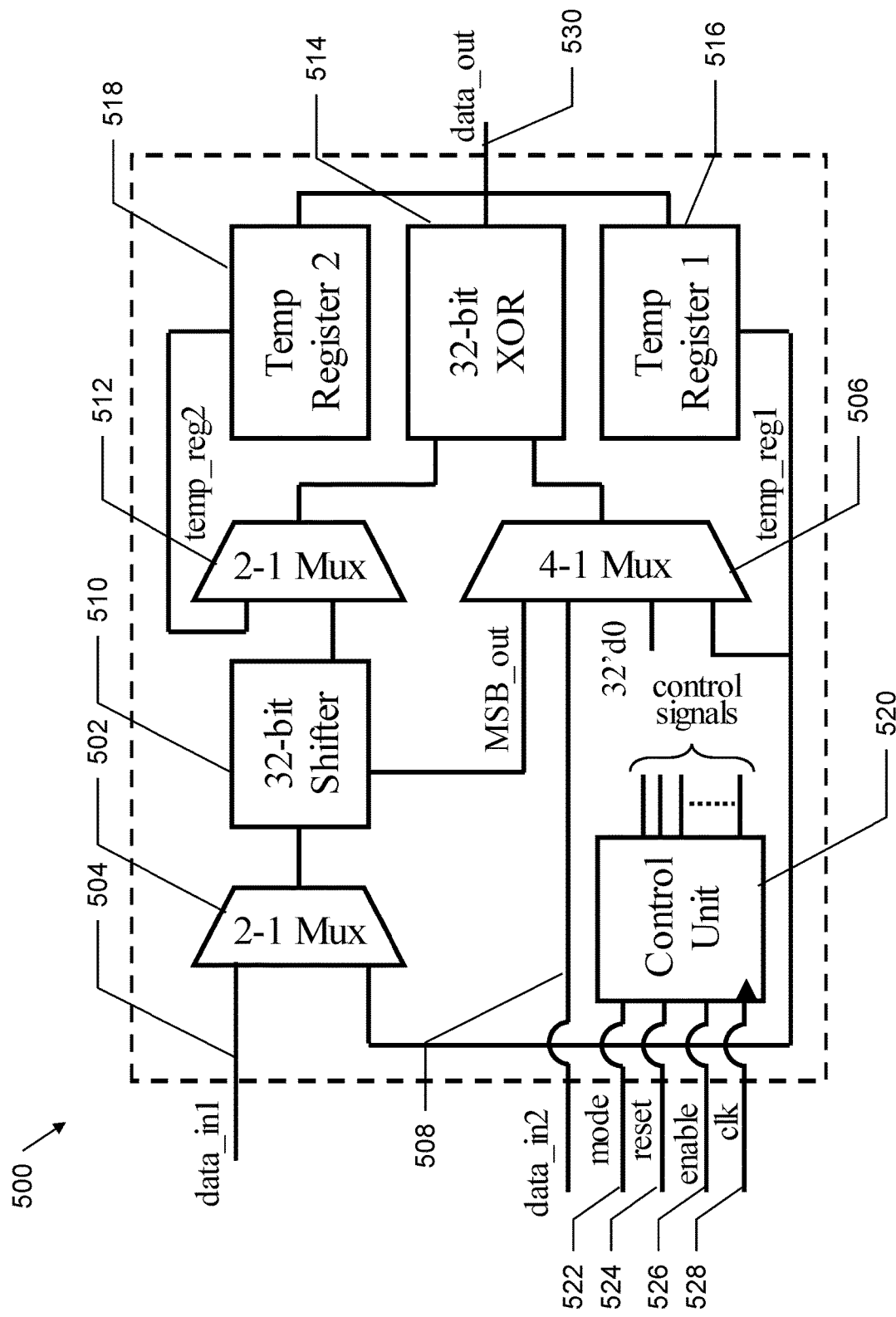
FIG. 5 illustrates an exemplary functional block diagram of a Galois Field Computation Unit (GFCU).

An example of a GFCU 500 is shown in FIG. 5. As discussed earlier, to compute AES and CRC, a particular set of operations needs to take place. GFCU 500 provides circuitry to implement these operations. GFCU 500 may include a 2-1 multiplexer 502, which may receive a first data input 504, a 4-1 multiplexer 506, which may receive a second data input 508, a 32-bit shifter 510, which may receive output from multiplexer 502, a 2-1 multiplexer 512, which may receive output from shifter 510, 32-bit exclusive-OR (XOR) logic 514, which may receive output from multiplexer 512 and multiplexer 506, temporary register 1 514, which may receive data output from XOR 514, and transmit data to multiplexer 502 and multiplexer 506, temporary register 2 518, which may receive data output from XOR 514, and transmit data to multiplexer 512, and control unit 520, which may receive control signals 522-528 external to GFCU 500 and generate control signals internal to GFCU 500.

GFCU 500 may support, for example, twelve different operations utilizing the components shown in FIG. 5 according to the values present at the "mode" control pins 522. Most of these operations work with the inputs (data_in1 504 and data_in2 508) and generates an output (data out 530). However, some of these operations work with the internal register values (temp_reg1 516 and temp_reg2 518) and updates the registers 516, 518. The different modes of operation have been developed in order to reuse the components throughout the computation steps of AES-128 and CRC-32.

An exemplary summary of the modes and functionality of each mode is shown in FIG. 6. In embodiments, GFCU 500 does not support the SubBytes step of AES, as it is a simple lookup operation with no actual logic involved. Therefore, SubBytes is integrated as a part of the overall system architecture.

Figure 7:
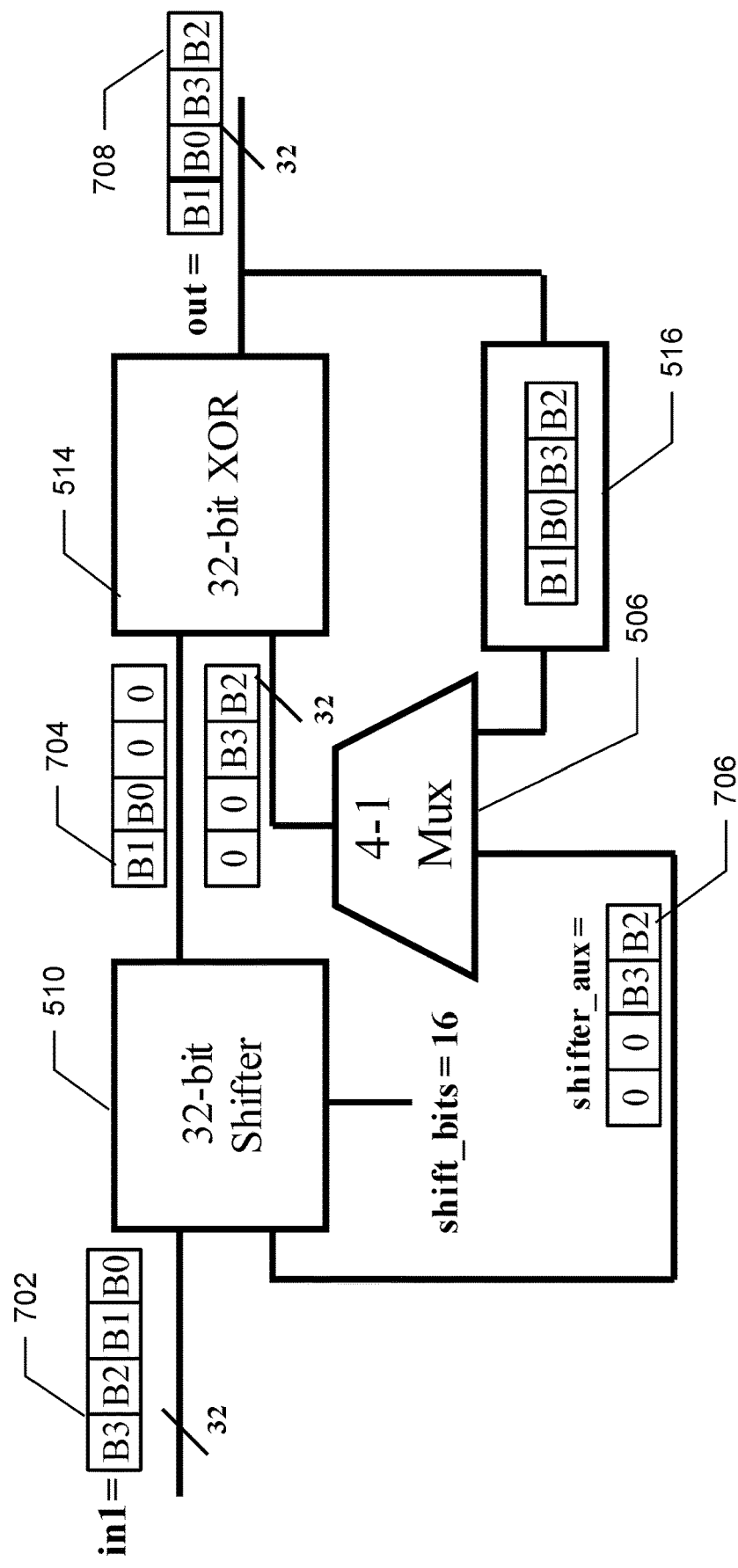
FIG. 7 illustrates an example of dataflow within the GFCU (simplified) for computing the ShiftRows operation on the $2^{nd}$ row of the state.

Using the modes shown in FIG. 6, the operations of AES and CRC within GFCU 500 may be explained. The ShiftRows step is the first logical operation of AES. GFCU 500 may complete the task of circular left shift using mode IV, V, VI and IX. Depending on the row being processed, a variable length left shift of 8, 16 or 24 bits may be performed. Each shift may be followed by an XOR operation between the result of the shift and the byte(s) that is/are shifted out (msb_out). An example of the ShiftRows operation is shown in FIG. 7. The $B_n$ notation is used to indicate the four bytes of the state rows. The result for each row of ShiftRows step requires a single clock to appear at the output. In the example shown in FIG. 7, an input state 702 including four bytes B3, B2, B1, B0 is input to shifter 510. Input state 702 is left shifted by 16 bits to form LSB intermediate value 704 and MSB intermediate value 706. MSB intermediate value 706 is selected by multiplexer 506 and input, along with LSB intermediate value 704 to XOR 514. XOR 514 forms output value 708, which is output from GFCU 500 and also stored in register 516 for later use.

The MixColumns step requires a series of operations to be completed. The benefit of using a row-based access to the state is that the computation of each step can be carried out on 32-bits together, compared to the column based access where computation must be done using individual bytes. However, when accessing the state in rows, the calculation of the MixColumns step is performed in a slightly different manner. Rather than multiplying a column from the input state with the constant matrix C to generate the elements of a column in the output state, the row based access reads a row from the input state and create a partial result to fill all the rows of the output state. The step is repeated for four rows of the input state and the results of each row are accumulated in the output state to yield the complete result. To explain this with clarity, the matrix multiplication steps for the first-row elements of the output state for a MixColumns operation 800 is shown in FIG. 8. To calculate each output row of the MixColumns step, the system needs to compute a multiplication by 2 802, a multiplication by 3 804, and two multiplications by 1 806, 808 for each row, and accumulate the result 810 in the designated row of the output state. The system can utilize the GFCU to perform each of these steps. The procedure may be repeated 812 for each row to complete the entire MixColumns operation 800.

Figure 9:
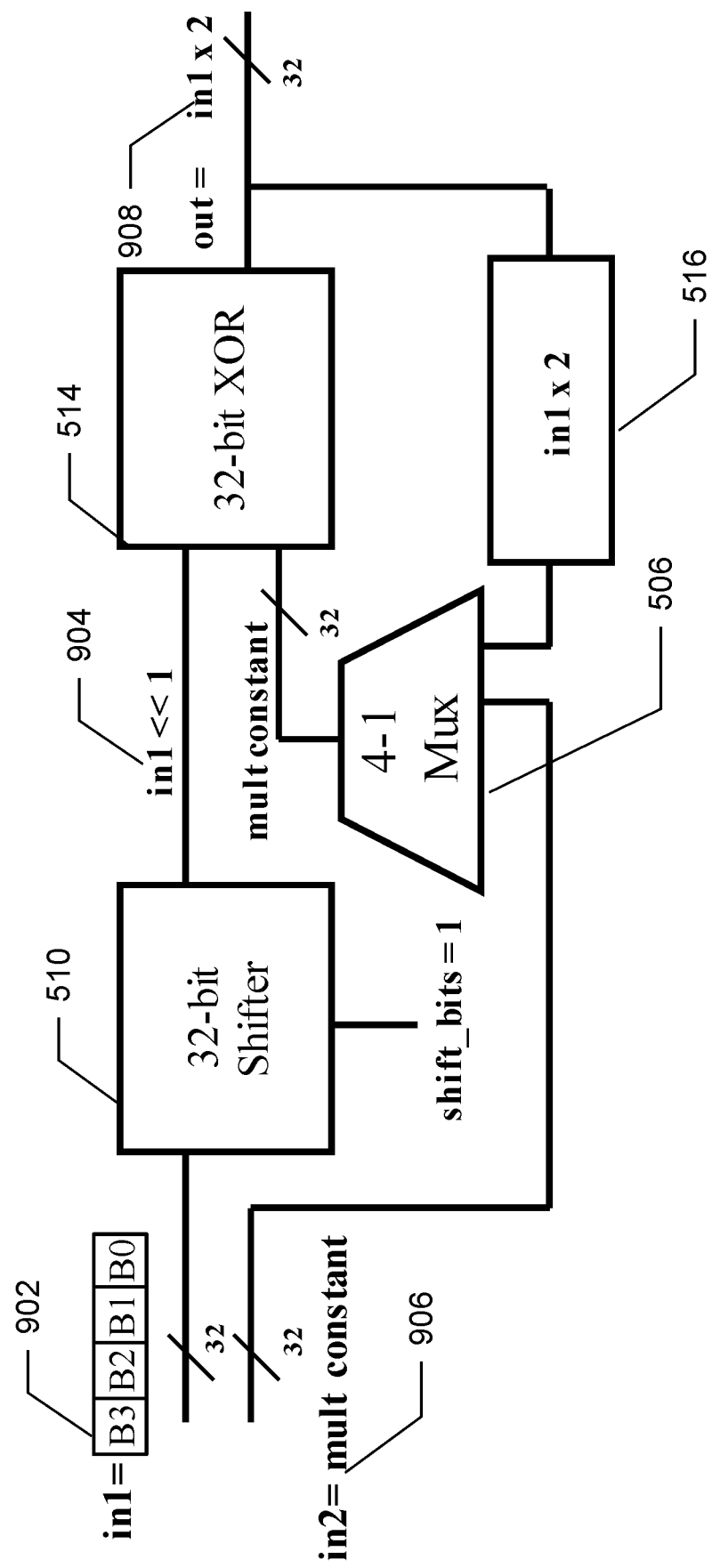
FIG. 9 illustrates an example of dataflow within the GFCU (simplified) for computing the "multiply-by-2" operation for a row of the input state.

It has been shown in Equation 4.e that multiply-by-2 in $GF(2^8)$ is a left shift and XOR operation with a constant value. Mode VII or VIII of GFCU 500 can be used to achieve this operation. An example of the operation of GFCU 500 to perform a multiply-by-2 is shown in FIG. 9. In the example shown in FIG. 9, an input state 902 including four bytes B3, B2, B1, B0 is input to shifter 510. Input state 902 is left shifted by 1 bit to form intermediate value 904, which is input to XOR 514. The constant value is input at input-2 906 to multiplexer 506 and is selected by multiplexer 506 for input to XOR 514. XOR 514 forms output value 908, which is output from GFCU 500 and also stored in register 516 for later use.

Multiplication by 3 is an additional XOR operation between the result of multiply-by-2 and the original input. Given that the result of multiply-by-2 will be stored in register 516, a multiply-by-3 can be achieved by executing mode II right after mode VII or VIII has been executed. Although this approach requires that a multiply-by-3 has to be computed after a multiply-by-2, it keeps resource usage to a minimum at no extra cost in the performance. Due to the complexity, MixColumns consumes the most clock cycles compared to the other steps. The remaining AddRoundKey step is a simple XOR operation between the state rows and round-key rows. This may be done using mode I of GFCU 500.

In embodiments, GFCU 500 also provides the capability to perform the steps for CRC computation. Mode X is designed to load the GFCU with the initial value of CRC-32. Each subsequent byte from the word sized inputs is loaded and XOR-ed with the existing CRC value using mode XI.

Figure 10:
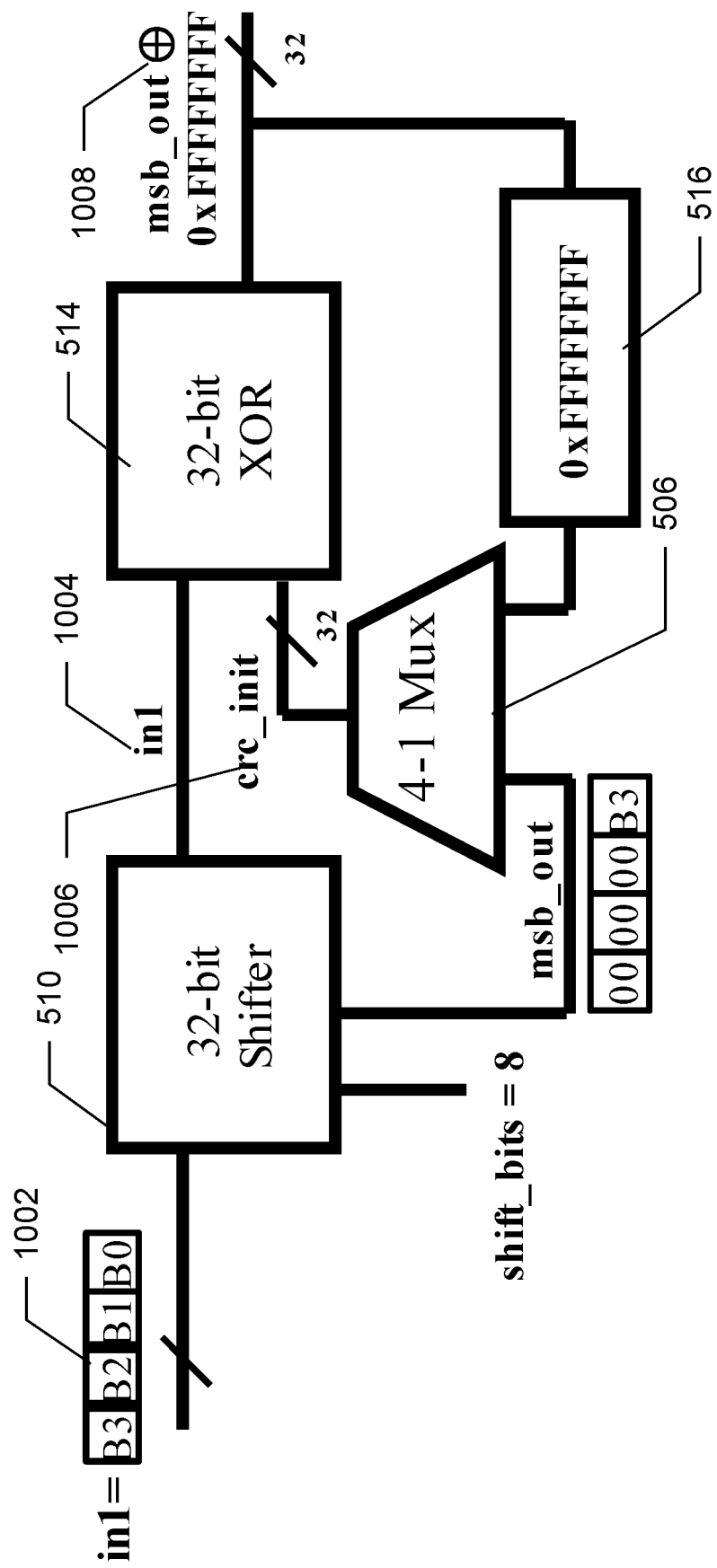
FIG. 10 illustrates an example of dataflow within the GFCU (simplified) for computing the CRCByteLoad operation on a row of the input state.

This is the previously discussed CRCByteLoad operation, an example of which is shown in FIG. 10. Computation of byte level CRC (CRCComp) is performed in mode XII, with the CRC polynomial provided by the system controller at the second input (in2). It is important to point out that the XOR performed in mode XII is conditional and depends on the most significant bit of the previous result available in temp_reg1. Mode III and IV is also utilized in the CRC computation flow for data arrangement and result inversion.

In the example shown in FIG. 10, an input state 1002 including four bytes B3, B2, B1, B0 is input to shifter 510. Input state 1002 is left shifted by 8 bits to form intermediate value 1004, which is input to XOR 514. CRC initial value 1006 is selected by multiplexer 506 for input to XOR 514. XOR 514 forms output value 1008, which is output from GFCU 500 and also stored in register 516 for later use.

Figure 11:
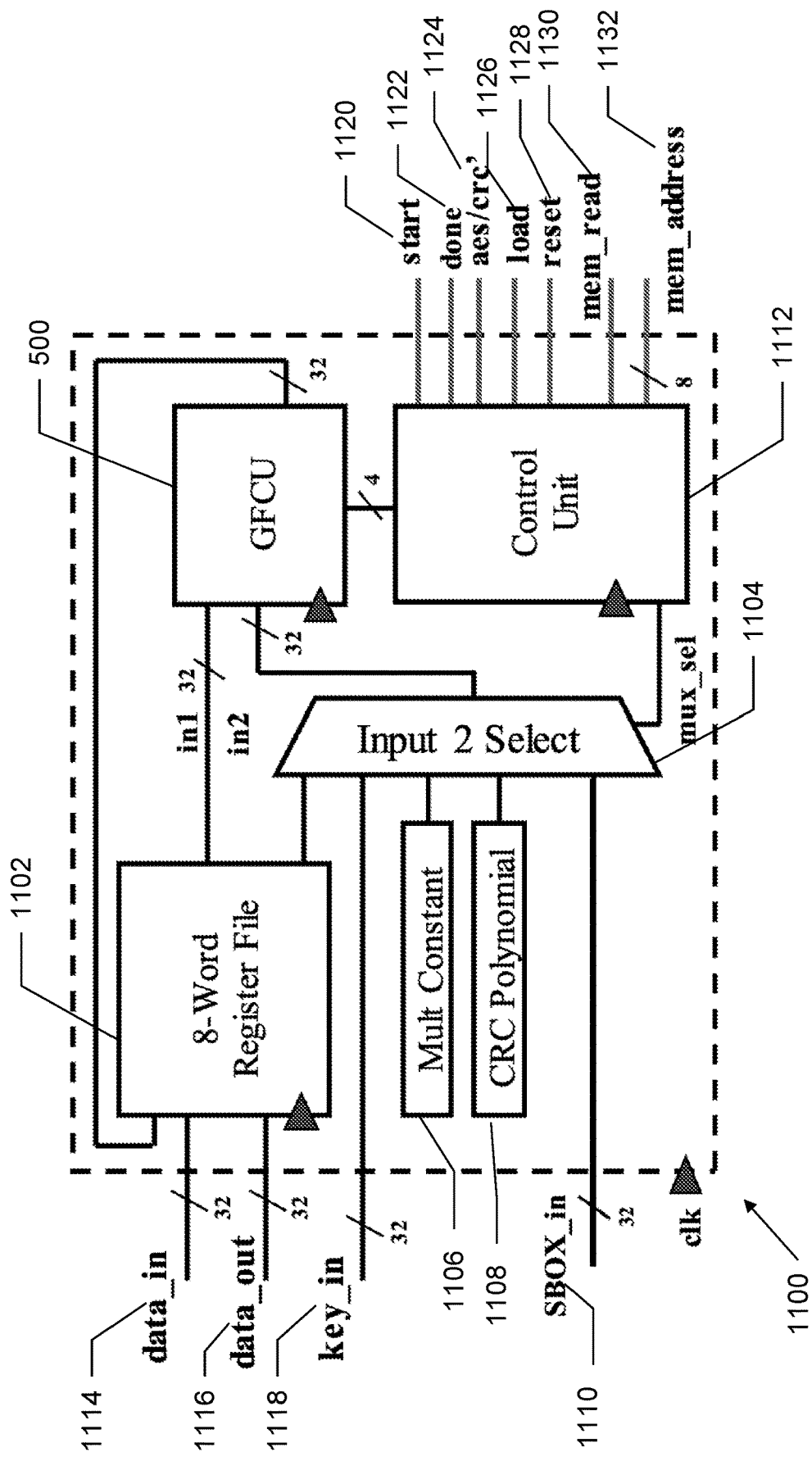
FIG. 11 illustrates an example of a block diagram of an AES/CRC engine including a GFCU.

In embodiments, GFCU 500 is itself a component in a system architecture to provide a fully functioning AES/CRC engine. An example of such an AES/CRC engine 1100 is shown in FIG. 11. AES/CRC engine 1100 integrates supporting components needed for computation. AES/CRC engine 1100 may include GFCU 500, a register file 1102 for storing input and output data, a multiplexer 1104 for selecting a value for input 2, a register 1106 for storing the GF multiplication constant, a register 1108 for storing the constant CRC-32 polynomial, an interface to an external SBOX/RSBOX ROM 1110 for byte substitution in the encryption and decryption process, and a central control unit 1112 for controlling multiplexer 1104 and the mode of GFCU 500 for either the AES or the CRC modes.

In embodiments, a control and programming interface of AES/CRC engine 1100 may include a 32-bit data in bus 1114, a 32-bit data out bus 1116, a 32-bit key in bus 1118, a control signal 1120 for starting computation, a control signal 1122 indicating completion of an operation, a control signal 1124 for selecting either AES or CRC, a load control signal 1126, a reset control signal 1128, and a memory interface for accessing the pre-calculated cipher key from the memory that may include an a read enable signal 1130, an address bus 1132, and a data input bus 1134.

In embodiments, AES/CRC engine 1100 two separate flows of computation for AES and CRC computation. The AES may be computed for 128 bits and therefore goes through the 10 rounds of AddRoundKey, SubBytes, ShiftRows and MixColumns by using GFCU 500 in different modes. The role of the control unit 1112 is to control the configuration of the functional unit in accordance with the flow of AES. In addition to controlling the functional unit, control unit 1112 also may send appropriate signals to the supporting registers and multiplexers to set up the proper datapath for the computed data and its storage.

Figure 12:
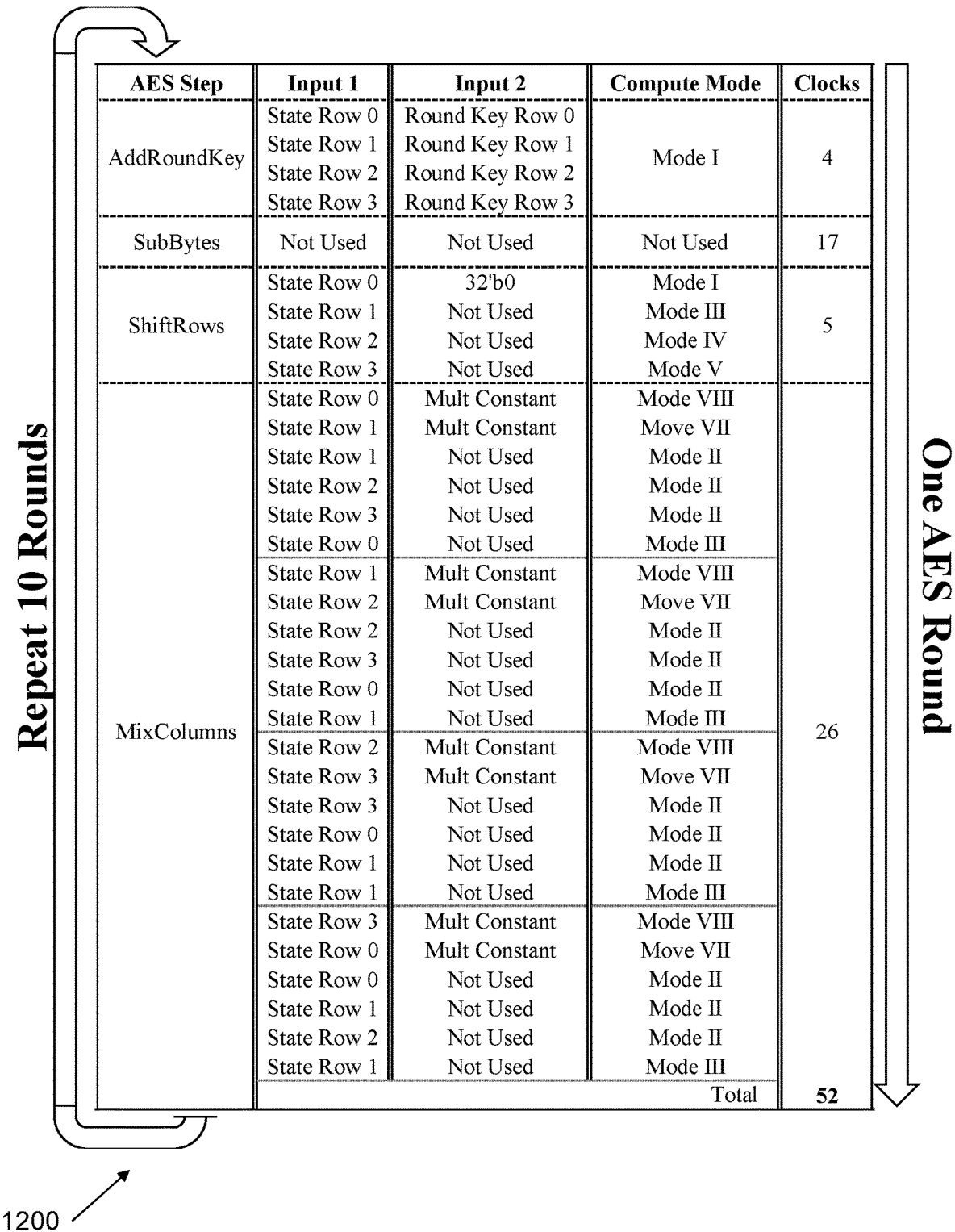
FIG. 12 illustrates an example of a flow of computation for one round of AES-128 Encryption.

An exemplary flow 1200 of processing for computing AES is shown in FIG. 12. In this example, computations for one round of processing may be shown. Encryption of 128-bit or 16-bytes of data takes 52 clock cycles for each round and a total of 468 cycles for 10 rounds. The clock requirement for the last round may be less as the AES computation does not require the MixColumns in the last round. In embodiments, computation of AES-192 or AES-256 may be performed by, for example, increasing the number of rounds as appropriate.

Figure 13:
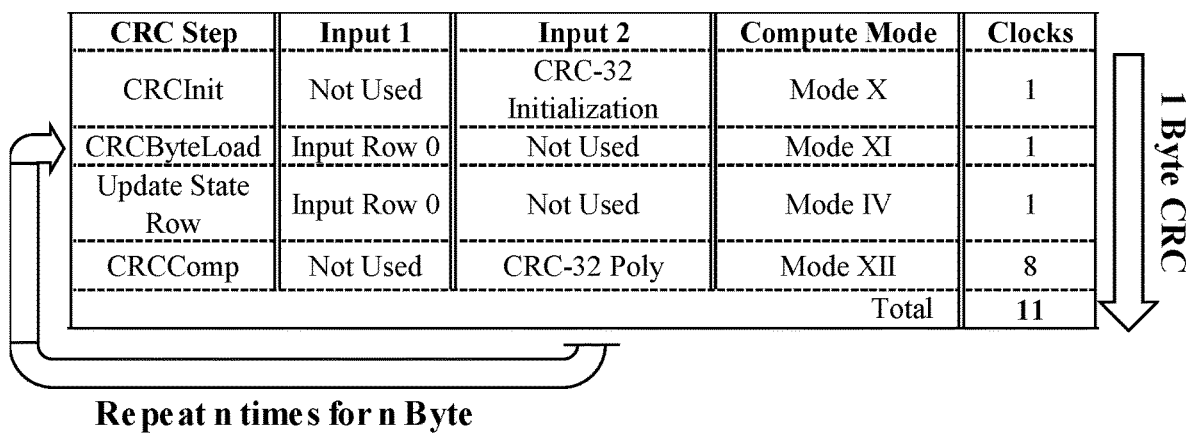
FIG. 13 illustrates an example of a flow of computation for CRC-32 computation for 1-byte of data.

The computation flow of CRC may be relatively simpler than that of AES as it involves only three distinct operations. The input data can be 16-bytes or larger and the resulting hash value may be stored in an internal temporary register of GFCU 500 and may be used to continue calculation if more data is available at the input. Once the computation is done; the CRC result can be read from the output port. An exemplary flow 1300 of processing for computing CRC is shown in FIG. 13. In this example, the CRC for one byte of data may be computed. The cycles required for CRC computation depends on the size of the input data. For an input of n-bits, a total of n×2 cycles may be required where each bit requires 2 cycles to complete.

In embodiments, AES/CRC engine 1100 may be implemented as an integrated circuit, or as a portion of an integrated circuit. For example, a hierarchical register-transfer level (RTL) description of the design may be developed, for example, using VERILOG™. The module descriptions and synchronous procedural blocks may be created with a focus to insert clock gating during logic synthesis. Accordingly, an asynchronous reset may be used to the ensure a known starting state even without the presence of the clock. Also, the clocked modules may be created with properly placed enable signal to allow the logic synthesis tool to identify and automatically insert clock gating cells. In addition to clock gating, attention may be given to disable the output of un-utilized modules. For example, the entire GFCU may be disabled when performing the SubBytes operation. The design was tested with a testbench in ModelSim and verified against pre-computed AES/CRC outputs to ensure the correct functionality.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. Apparatus comprising:
   computation circuitry adapted to perform Galois Field computations;
   control circuitry adapted to control the computation circuitry so as to selectively compute either an Advanced Encryption Standard cipher or a Cyclic Redundancy Check, wherein the control circuitry comprises:
   memory interface circuitry adapted to request a plurality of externally stored predetermined constant values;
   selection circuitry adapted to select a predetermined constant value for input to the computation circuitry;
   memory circuitry adapted to store a plurality of input and output data; and
   control circuitry sequencing circuitry adapted to output control signals to the selection circuitry, the memory circuitry, and the computation circuitry in a plurality of sequences, each sequence adapted to perform a computation.

2. The apparatus of claim 1, wherein the computation circuitry comprises:
   exclusive-OR circuitry adapted to perform a bitwise exclusive-OR on selected data;
   shifter circuitry adapted to perform a circular left shift on selected data;
   memory circuitry adapted to store a plurality of data;
   selection circuitry adapted to select data input to or output from the exclusive-OR circuitry, the shifter circuitry, and the memory circuitry; and
   computation circuitry sequencing circuitry adapted to receive the control signals from the control the control circuitry selection circuitry to control the selection circuitry, the memory circuitry, the exclusive-OR circuitry, and the shifter circuitry to perform computational steps in the plurality of sequences adapted to perform computations.

3. The apparatus of claim 2 wherein the computational steps comprise at least one step of an AES AddRoundKey operation, an AES MixColumns operation, an AES ShiftRows operation, an AES InvShiftRows operation, an AES InvMixColumns operation, a CRC CRCInit operation, a CRC CRCByteLoad operation, and a CRC CRCComp operation.

4. The apparatus of claim 3 wherein the AES ShiftRows operation comprises:
   the shifter circuitry shifting an input state to form a most significant intermediate value and a least significant intermediate value; and
   the exclusive-OR circuitry performing a bitwise exclusive-OR on the most significant intermediate value and a least significant intermediate value to form an output value representing an output of the AES ShiftRows operation.

5. The apparatus of claim 3 wherein the AES MixColumns operation comprises a matrix multiplication operation comprising a Galois Field multiply-by-2 operation comprising:
   the shifter circuitry shifting an input state to form an intermediate value;
   memory interface circuitry adapted to request a plurality of externally stored predetermined constant values providing a selected predetermined constant value; and
   the exclusive-OR circuitry performing a bitwise exclusive-OR on the intermediate value and the selected predetermined constant value to form an output value representing an output of the Galois Field multiply-by-2 operation.

6. The apparatus of claim 5 wherein the AES MixColumns operation further comprises a matrix multiplication operation comprising a Galois Field multiply-by-3 operation comprising:
the exclusive-OR circuitry performing a bitwise exclusive-OR on the input state and the output of the Galois Field multiply-by-2 operation to form an output of the Galois Field multiply-by-3 operation.

7. The apparatus of claim 3 wherein the CRC CRCByteLoad operation comprises:
the shifter circuitry shifting an input state to form an intermediate value;
memory interface circuitry adapted to request a plurality of externally stored predetermined constant values providing a selected predetermined constant value representing a CRC initial value; and
the exclusive-OR circuitry performing a bitwise exclusive-OR on the intermediate value and the selected predetermined constant value to form an output value representing an output of the CRC CRCByteLoad operation.

8. The apparatus of claim 1, wherein the apparatus is implemented in at least one of a consumer electronic device and a biomedical device.

9. A method comprising:
performing Galois Field computations using computation circuitry;
controlling the computation circuitry so as to selectively compute either an Advanced Encryption Standard cipher or a Cyclic Redundancy Check, wherein the controlling comprises:
requesting a plurality of externally stored predetermined constant values;
selecting a predetermined constant value;
storing a plurality of input and output data; and
controlling selection and output of the predetermined constant values and of the input and output data to the computation circuitry in a plurality of sequences, each sequence adapted to perform a computation.

10. The method of claim 9 wherein the computation circuitry comprises:
exclusive-OR circuitry adapted to perform a bitwise exclusive-OR on selected data,
shifter circuitry adapted to perform a circular left shift on selected data,
memory circuitry adapted to store a plurality of data,
selection circuitry adapted to select data input to or output from the exclusive-OR circuitry, the shifter circuitry, and the memory circuitry, and
computation circuitry sequencing circuitry; and
the method further comprises:
receiving the control signals to control the selection circuitry, the memory circuitry, the exclusive-OR circuitry, and the shifter circuitry to perform computational steps in the plurality of sequences adapted to perform computations.

11. The method of claim 10 wherein the computational steps comprise at least one step of an AES AddRoundKey operation, an AES MixColumns operation, an AES ShiftRows operation, an AES InvShiftRows operation, an AES InvMixColumns operation, a CRC CRCInit operation, a CRC CRCByteLoad operation, and a CRC CRCComp operation.

12. The method of claim 11 wherein the AES ShiftRows operation comprises:
shifting an input state, by the shifter circuitry, to form a most significant intermediate value and a least significant intermediate value; and
performing a bitwise exclusive-OR, by the exclusive-OR circuitry, on the most significant intermediate value and a least significant intermediate value to form an output value representing an output of the AES ShiftRows operation.

13. The method of claim 11 wherein the AES MixColumns operation comprises a matrix multiplication operation comprising a Galois Field multiply-by-2 operation comprising:
shifting an input state, by the shifter circuitry, to form an intermediate value;
providing a selected predetermined constant value; and
performing a bitwise exclusive-OR, by the exclusive-OR circuitry, on the intermediate value and the selected predetermined constant value to form an output value representing an output of the Galois Field multiply-by-2 operation.

14. The method of claim 13 wherein the AES MixColumns operation further comprises a matrix multiplication operation comprising a Galois Field multiply-by-3 operation comprising:
performing a bitwise exclusive-OR, by the exclusive-OR circuitry, on the input state and the output of the Galois Field multiply-by-2 operation to form an output of the Galois Field multiply-by-3 operation.

15. The method of claim 11 wherein the CRC CRCByteLoad operation comprises:
shifting, by the shifter circuitry, an input state to form an intermediate value;
providing a selected predetermined constant value representing a CRC initial value; and
performing a bitwise exclusive-OR, by the exclusive-OR circuitry, on the intermediate value and the selected predetermined constant value to form an output value representing an output of the CRC CRCByteLoad operation.

16. The method of claim 9, wherein the method is performed in at least one of a consumer electronic device and a biomedical device.

* * * * *